S. TROOD.
MACHINE FOR CONTINUOUS TREATMENT OF METALS.
APPLICATION FILED JUNE 16, 1914.
1,224,340.
Patented May 1, 1917.
2 SHEETS—SHEET 1.
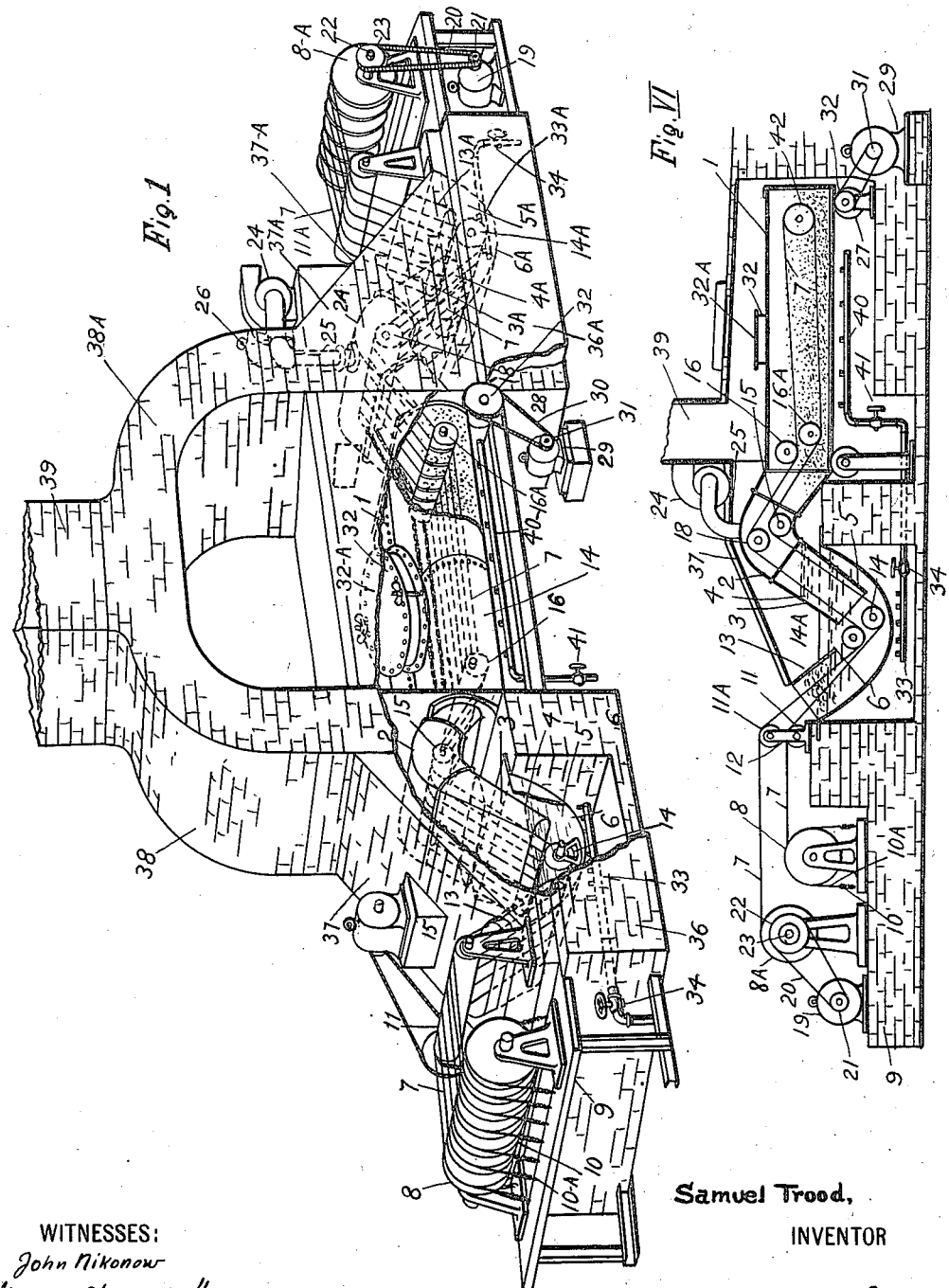
WITNESSES:
John Nikonow
Alexander Chernyshoff
Samuel Trood,
INVENTOR
BY William A. Darrah
ATTORNEY S. TROOD.
MACHINE FOR CONTINUOUS TREATMENT OF METALS.
APPLICATION FILED JUNE 16, 1914.
1,224,340.
Patented May 1, 1917.
2 SHEETS—SHEET 2.
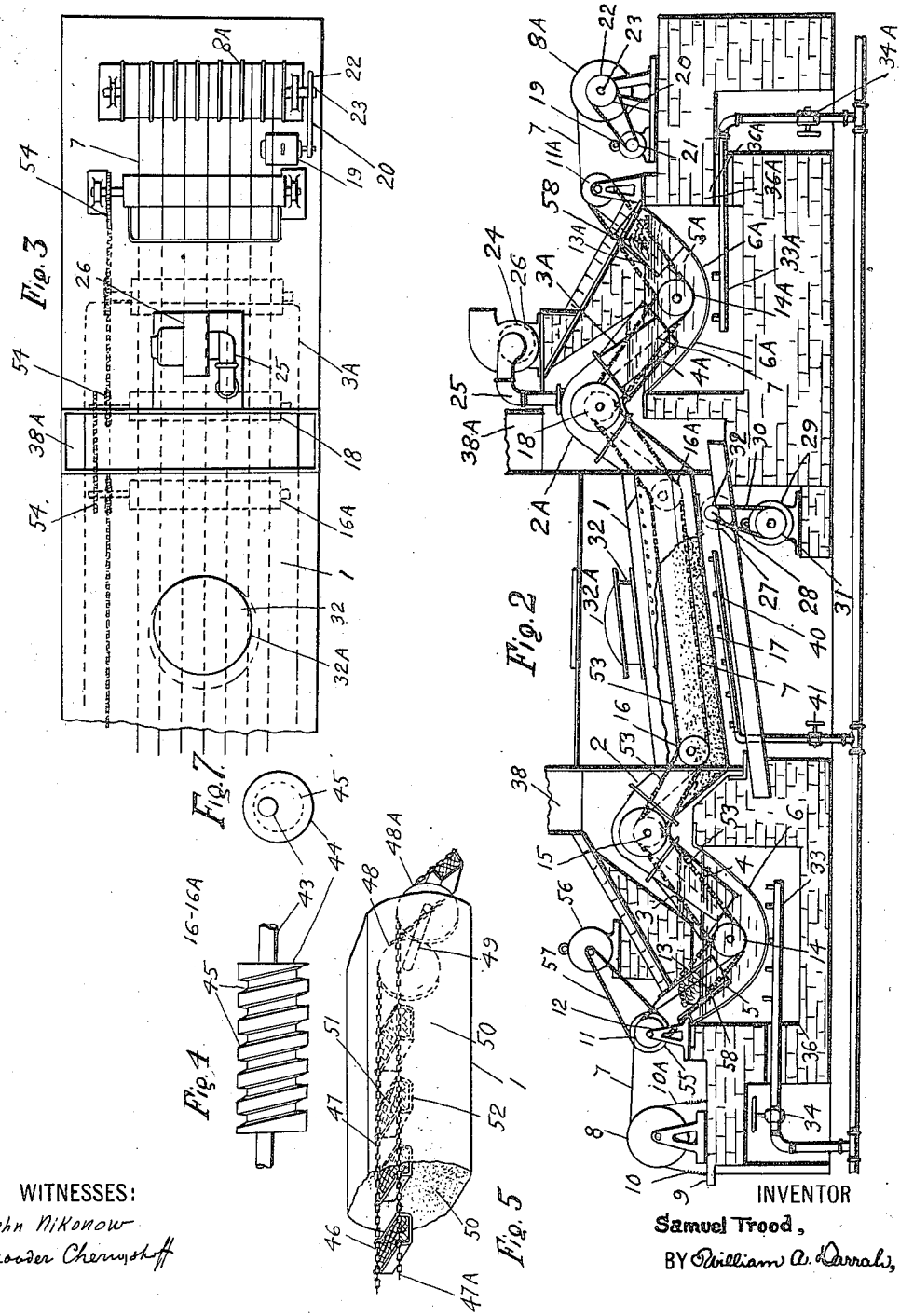
WITNESSES:
John Nikonow
Alexander Chernyshoff
INVENTOR
Samuel Trood,
BY William A. Darrah,
ATTORNEY

UNITED STATES PATENT OFFICE.

SAMUEL TROOD, OF NEW CASTLE, PENNSYLVANIA, ASSIGNOR TO INDUSTRIAL DEVELOPMENT COMPANY, A CORPORATION OF PENNSYLVANIA.

MACHINE FOR CONTINUOUS TREATMENT OF METALS.

1,224,340.   Specification of Letters Patent.   Patented May 1, 1917.

Application filed June 16, 1914. Serial No. 845,418.

*To all whom it may concern:*

Be it known that I, SAMUEL TROOD, a citizen of the United States, and a resident of New Castle, in the county of Lawrence and State of Pennsylvania, have invented a new and useful Improvement in Machines for Continuous Treatment of Metals, of which the following is a specification.

My invention relates to the coating of metals with a protecting layer and more directly to the process of forming a metallic or other coating, by the vapor process, and provides a device for continuously subjecting a new supply of metal to the treating conditions and removing the portion of metal already treated. A special case which has been chosen for illustration is a vapor process similar to that disclosed in United States Patents #829386 of August 28, 1906, #701298 of June 3, 1902, &c., Sherard-Cowper-Coles or in application #829662 series 1900, filed April 4, 1914, vapor treatment of metals. It will be obvious, however, that the device here disclosed may be used for other processes and I do not wish therefore, to confine the applications of the machine to the processes described in the above noted applications.

It will be readily understood that it is very desirable to be able to continuously treat a wire, a band, or strip or sheet of metal, as for instance iron, by progressively subjecting a new portion of the metal to the treating conditions, as for instance to the zinc dust, in the case of United States Patent #701298 referred to above, or to the powdered material and reduced pressure described in United States application #829,662 series of 1900.

The advantages of such continuous treatment are many. It allows the economical and satisfactory treatment of wire, cable, strip, plates, chains, and by the employment of a continuous chain of buckets, any small objects may be treated. It reduces the time required for the process and the labor and waste incidental to frequent handling. It reduces the equipment required. In the case of the reduced pressure vapor process described in United States application #829,662 series of 1900, the time required may be so reduced that the material may be treated practically as rapidly as the wet or hot galvanizing processes.

A further result which may be accomplished by my machine is the automatic annealing, tempering, or other desired heat treating of the metal, wire, band, strip, sheet, cable, &c.

The objects of the device covered by this invention are therefore as follows:

First—to provide a continuous means for successively coating metal objects or successive portions of metal.

Second—to provide an automatic continuous means for successively giving a metal any desired heat treatment.

Either of these objects separately or both together come within the scope of my invention. In considering one specific form of my invention, the following drawings illustrate the general principles although it will be evident that many modifications may be made and many different groupings of parts devised, all of which come within the scope of my invention.

Figure 1—shows in perspective, with some sections broken away, a general view of one modification of my machine adapted for the treatment of wire, strip, cable, &c.

Fig. 2—is a side elevation, partly in section of the same type of machine while, Fig. 3—is a partial plan view corresponding to Fig. 2.

Fig. 4—is a detail view of one of the members for moving the material in lateral and vertical directions.

Fig. 5—shows a detail of a bucket chain adapted to be used with a modification of this machine, for the treatment of nuts, bolts and small objects.

Fig. 6—shows diagrammatically in elevation another arrangement of my machine in which the material treated returns through the same seal as that in which it enters.

Fig. 7—shows an end elevation of the member illustrated in Fig. 4.

Referring to the details shown on the drawings, Fig. 1, illustrates a machine for treating wire, cable, strip or sheet, according to the dimensions of the various parts. For convenience of illustration the device will be described as constructed for the treatment of wire as the necessary modifications for applying the device to other material will be obvious.

Reference No. 1 indicates an air tight chamber or drum, connected by elbows (2)—(2ᴬ) to seals (3)—(3ᴬ) which consist of tubes (4)—(4ᴬ) dipping into the liquid (5)—(5ᴬ) of the receptacles (6)—(6ᴬ). The reels (8)—(8ᴬ) carrying wire to be treated (7) are mounted on platforms (9) and brake springs (10) supply the necessary tension to bands (10ᴬ) to prevent the wire from unwinding too freely. The wire (7) passes over guide roll (11) which is mounted on bearings (12) then through guide tube (13) into receptacle (6) and around guide roll (14). The wire thus passes into liquid (5) which may be of any suitable composition. In the case illustrated melted lead may be employed to advantage but I do not wish to be limited to this choice as many other materials may be very satisfactory. Thus mercury, oil, melted tin or other alloys, or even water may be successfully employed under the proper conditions and using the proper construction and dimensions. The liquid will be drawn part way up into the tube (4) when the pressure is lowered in chamber (1) by pump (24), but when the static head equalizes the difference in pressure between the drum and the outer air, the liquid will rise no higher in tube (4).

From receptacle (6) the wire (7) passes through tube (4) which thus acts as a seal to prevent the entrance or exit of air or vapors. The wire (7) is next guided by roll (15) to guide rolls (16)—(16ᴬ) (detail of which is shown in Fig. 4) which are illustrated as cylindrical rollers mounted eccentrically on the shaft, the guiding grooves being arranged in planes inclined to the axis as will be further described in connection with Fig. 4. While passing between the rollers (16)—(16ᴬ) the wire (7) is exposed to the action of the treating vapor, liquid or dust or powder as the case may be. In case it is desired to coat the wire with a layer of zinc, as may be assumed for purposes of illustration, reference number 17 indicates the zinc dust used in treatment. After leaving rollers (16)—(16ᴬ), the wire (7) passes over guide (18) into seal (3ᴬ) through tube (4ᴬ) into liquid (5ᴬ) receptacle (6ᴬ) over guide roller (14ᴬ), then into guide tube (13ᴬ) over guide roller (11ᴬ) to reels (8ᴬ) on which the finished product is wound. The battery of reels (8ᴬ) for the finished product are driven by motor (19) through belt (20) which connects driving pulley (21) with pulley (22) on the shaft (23) which carries the reels (8ᴬ).

A pump (24) is connected by pipe (25) to the treating chamber 1, and is driven by motor (26).

An eccentric cam roll (27) mounted on shaft (28) is driven by motor (29) through belt or chain (30) and pulleys (31) and (32). This cam (27) serves to rock chamber (1), one end of which rests upon it, and this affords one means of re-distributing the treating material in chamber (1) in case it is desired. A manhole (32) is provided to allow access to chamber (1) for cleaning, filling, adjusting, &c. A tight fitting cover (32ᴬ) is provided to prevent the entrance or exit of air or vapors.

Burners (33)—(33ᴬ) are provided to heat the receptacles (6)—(6ᴬ) to the desired temperatures, and to heat the seal (3) to the temperature required to anneal the wire or give it any desired heat treatment. The burner (33) is controlled by cock (34).

The receptacles (6)—(6ᴬ) are mounted on supports (36)—(36ᴬ) which may be conveniently made of masonry, and arranged to support chamber (1). Walls (37)—(37ᴬ) inclose the receptacles (6)—(6ᴬ) and connect with the flues (38)—(38ᴬ) which lead to the stack (39). Burners (40) controlled by cock (41) supply the necessary heat for the chamber (1) in which the treating is done.

Figs. 2 and 3 are respectively a side elevation and a plan showing substantially the same parts as Fig. 1 but with a slightly different arrangement, although the functions of the parts are similar.

In addition to the parts previously described Figs. 2 and 3 show a method of driving all guide rolls by an endless chain or cable (53) passing over a series of sprockets or pin wheels (54), and out through seal (3) to sprocket (55) which is in turn driven by motor (58) through the medium of chain (57).

There is thus provided a means, independent of the wire or cable to be treated, for driving the guide rolls. In many cases this will be unnecessary as the cable or wire will transmit the necessary forces but if the temperatures are high and the material to be treated is weak, the additional means will be desirable.

Fig. 4 shows a detail of the rollers (16)—(16ᴬ) of Figs. (1), (2) and (3) and illustrates one form of mechanism employed to insure that the wire is continuously in contact with the treating material. In Fig. (4) reference number (43) indicates the shaft on which is eccentrically mounted the multiple pulley (44) which is provided with grooves (45) through which the wire is passed. The planes of grooves (45) are not perpendicular to the shaft (43) and as a result the wire is moved laterally as the pulley (44) rotates. The eccentric mounting of the pulley (44) causes the wire to move in a vertical direction as the shaft (43) rotates. This compound motion therefore prevents the formation of small tunnels through the treating material which might happen if the wire passed continuously along the same axis. This is one of the means of insuring that all portions of the wire under treatment are continually in contact with the treating material. A further means of accomplishing this result is the eccentric roll (27) driven by motor (29). This roll imparts a rocking motion to the entire chamber (1) thus jarring the treating material into contact with the wire.

Either or both of these means may be used but it will not usually be necessary to employ both together, although both are shown on the drawings for purposes of illustrations.

Fig. 5 shows in perspective a detail of the application of an endless chain of buckets to my machine thus providing for the treatment of smaller objects by the continuous process. In Fig. 5, reference number 1, indicates the treating chamber, (46), the cars or buckets which are supported and driven by chains (47)—(47$^A$) which pass over sprockets (48)—(48$^A$) mounted on axle (49). It will be obvious that chains (47)—(47$^A$) of Fig. 5 may take the same path as the wire (7) of Figs. (1), (2) and (3), and may return upon itself outside thus providing means of continuously introducing objects to the treating drum (1) and removing them as treated without exposing the interior of the drum (1) to the outer air.

The bucket (46) should preferably be provided with a top (51) of screen or expanded metal or the equivalent to freely admit the dust or treating material, the said top being fastened to a scoop (52) which may also be perforated to allow free entrance and exit of treating material.

It is of course desirable that the perforation of the buckets (46) should be sufficiently fine to retain the objects being treated, but they should be as large as possible.

In operation the buckets (46) are intended to pass through and come into intimate contact with the treating material (50) in chamber (1). This may be accomplished in a similar manner to that illustrated for the wire (7) in Figs. (1), (2) and (3).

Fig. (6) shows a modification of my machine, so arranged that the wire (7) or strip, chain, cable, &c., returns through the same seal, or at the same end but separate seal, as it enters. One result which is accomplished by causing the wire (7) to return in a reverse direction through the treating chamber is to re-distribute the treating material. Thus on continually passing the wire through chamber (1), in one direction the dust, powder, liquid or divided material will be gradually moved in the direction of the wire thus tending to accumulate at the end at which the wire leaves. If, however, the wire (7) be caused to pass over guide (42) and return in a reverse direction, then as much material will be carried by the wire in the reverse direction, and an equilibrium will be established. The machine of the chamber (1) shown in Fig. (2) is another independent means of accomplishing this result. The rocking eccentric roll (27) driven by motor (29), accomplishes the same result by jarring the material until it falls to a common level. The lateral and vertical motion of the wire further aids in the result, and constitutes an independent means of accomplishing this end.

The chamber 1 rests at the ends on support 36 and 36$^A$. No special pivoting provision is necessary, as the corner of the drum resting upon support 36 is sufficient and readily allows the slight motion of the drum which is necessary. The elbows extending from the chamber (1) are shown rigidly fastened to chamber 1, although this point is immaterial, the essential feature being that the joint between the elbows and the chamber must be sufficiently tight to prevent a leakage of gas or vapor.

Having now described the machine in detail, I will explain the method of operation and the principles involved taking again as a specific example the treatment of a wire, cable or strip with zinc by the vapor process. In the commercial processes commonly employed to-day the metal is heated for several hours in the presence of zinc dust. The process disclosed in application Serial #829,662 filed April 4, 1914, "vapor treatment of metals" however, enables the time necessary to be materially reduced so that only a few minutes are required for exposure to the zinc dust and vapor. As this process requires the use of a reduced pressure the pump (24) is provided as shown in the drawings. Both the process now commonly employed, or the reduced pressure process require that air be excluded as far as possible and that the vapors within the treating chamber be prevented from escaping. To accomplish this result the seals (3)—(3$^A$) are employed, although these merely represent one of many varieties which may be used with good results.

As it is often desirable to anneal the wire or cable, or to give it other heat treatment, the seal (3) may be made of such liquid (as for example melted lead), which will withstand 1100° C. in a vacuum before boiling) that it can be heated to the desired temperature and will thus raise the temperature of the wire to the necessary degree. If it is necessary to cool the metal in order to harden it, it may be passed through a cooler bath, as for instance, mercury cooled by water coils.

The seal (3) which may be maintained at any desired temperature by the proper burners therefore affords an automatic means for giving the wire, cable, sheet, strip or other article any desired heat treatment such as annealing.

It has been found also that if the metal is heated to a high temperature while subjected to treatment, the process progresses more uniformly, and more rapidly. The heated seal or trap (3) therefore, affords means for heating the incoming metal to the requisite temperature for most satisfactory treatment. The seal (3ᴬ) through which the wire leaves the treating chamber may be maintained at a lower temperature than seal (3) thus preventing any deterioration of the coating or treatment by the material or temperature of the outgoing seal.

As a further protection for both the incoming and outgoing material the guide tubes (13)—(13ᴬ) may be filled with some inert or reducing material, (see reference number 58 of Fig. 2) such as sand or charcoal which will float upon the liquid of the seal and prevent the air from attacking the wire while it is at an elevated temperature. The inert material (58) also protects the liquid of the bath from oxidation or deterioration.

In operation, therefore, the wire, cable, strip or sheet to be treated is unwound from reel (8) the speed of which is controlled by spring brakes (10)—(10ᴬ) and passes over various guides, through the charcoal or sand (58) into the bath (5) of the seal (3) and up the seal (3) where it is heated to the necessary temperature by contact with the liquid (5) of the seal.

The wire then passes over various rolls and enters the treating chamber (1), over eccentric rolls (16)—(16ᴬ) which move it laterally, and vertically as it passes through chamber (1). When the wire emerges from chamber (1) it is properly treated and passes out through seal (3ᴬ) into liquid (5ᴬ) of receptacle (6ᴬ) and into guide tube (13ᴬ) to the reels (8ᴬ) driven by the motor (19) on which the finished product is wound.

It will be obvious that the machine here disclosed may be employed with minor modifications for use with a liquid or gas instead of a powder or dust. It will be evident further that the use of a reduced pressure only hastens the process and that my machine will operate equally satisfactorily without the vacuum pump and the reduced pressure. In some cases it may even be desirable to employ an increased pressure and the same machine with small modifications may be employed with a pressure greater than atmospheric within the treating chamber. I therefore desire to include in, but do not wish to confine this invention to the use of a dust or powder or to the use of any definite pressure as these are details determined by the nature of the materials and the type of treatment desired.

In this specification and in the claims by the term "metal" or "metal to be treated" I intend to include the wire, cable, sheet or strip which may be of iron, copper, brass, aluminum or other material, although one of the largest applications will be the treatment of iron. The term "treating chamber" or "drum" refers to the inclosed space within which the treatment is given and may be made of steel, iron, brick, porcelain or other suitable material, although I perefer to use a metal drum.

By "treating material" I refer to the liquid, solid or vapor which in contact with the metal to be treated produces the required alloy or surface layer. Thus zinc dust commercially known as "blue dust," or powdered aluminum commercially known as "Aluminum bronze" may be successfully employed in practice, although I do not wish to be limited to this choice.

By the term "vapor treating" I refer to the various processes of heating a metal in the presence of vapors or gases which may cause a deposit or coating on the metal, may change the nature or properties of the surface and cause other similar transformations. "Sherardizing" is one specific example of a process for which my machine is designed, although it is equally applicable to many others. Thus the process described in application filed April 4, 1914, entitled "The vapor treatment of metals" is specially adapted to be carried out by this machine. By the terms "apparatus for vapor treating metals; or machine for vapor treating metals" it is intended to include a device for applying processes of the general class and similar to those described in this application.

The term "heat treatment" includes annealing, tempering, hardening, &c., any or all of which may be accomplished by the means here disclosed. The term "seal" includes traps, flaps, stuffing boxes and similar means as it will be evident that if a reducing pressure is not employed, it will not be necessary to resort to the elaborate means here disclosed.

By the term "heating means" it is understood that any source of heat may be employed such as gas or liquid burners, coal burners, electrical heaters, &c., as the form of the heating device is of no importance providing it can be properly controlled.

The term "guide members" refers to the rolls, buckets, chains, and other devices arranged to direct and control the motion of the wire, strip, sheet or small metal objects on its passage through the machine.

Having fully described my invention, what I claim as new and desire to secure by Letters Patent is:—

1. An apparatus for vapor treating metal comprising a metal treating chamber, means for heating said chamber, a seal member for controlling the passage of gases with regard to said chamber and designed to maintain a substantial vacuum therein, and means for controlling the pressure within said chamber.

2. An apparatus for vapor treating metal comprising a chamber, a liquid seal for said chamber designed to withstand a pressure substantially equal to that of the atmosphere, a source of heat for said chamber and means for varying the pressure within said chamber.

3. A machine for vapor treating metal comprising a chamber, a seal of heavy liquid for said chamber designed to withstand a pressure substantially that of the atmosphere, and a source of heat for said chamber and said seal.

4. A machine for vapor treating metals comprising a chamber, a liquid metal seal for said chamber designed to withstand a pressure approximately that of the atmosphere, and a source of heat for said chamber and said seal.

5. A machine for vapor treating metals comprising a metal treating chamber, a heated liquid bath serving as a seal for said chamber, a trap for preventing a loss of material from said chamber, and means of controlling the pressure within said chamber.

6. A device for vapor treating metal comprising a chamber adapted to contain vapor supplying material and liquid seal for said chamber, said seal being designed to withstand a temperature and pressure substantially that of the atmosphere.

7. A machine for vapor treating metal comprising a metal treating chamber adapted to contain the vapor supplying material, the seal members for said chamber adapted to withstand a pressure approximately equal to that of the atmosphere, and a source of heat for said chamber and said seal.

8. A machine for treating metal comprising a treating chamber, a seal member therefor adapted to withstand the pressure substantially equal to that of the atmosphere, heating members for said treating chamber and seal member, and a pump arranged to control the pressure within the treating chamber.

9. A machine for treating metal comprising a metal treating chamber, a seal member therefor adapted to stand a pressure substantially equal to that of the atmosphere, guides for controlling the direction of said metal to be treated, a heating member for said treating chamber and a pump for reducing the pressure within said heating chamber.

10. A machine for treating metal comprising a metal treating chamber, seal closing said chamber for passage of gases at pressures substantially equal to that of the atmosphere, heating means for said chamber and seal and a pump for controlling pressure within said metal treating chamber.

11. An apparatus for vapor treating metal comprising a metal treating chamber, seal therefor, a system of guides arranged to direct the path of the metal through the chamber and seal and means for vibrating said chamber.

12. A machine for continuously treating metal comprising a metal treating chamber, liquid seal for said chamber, a system of guide rolls for the metal to be treated, a heater for said treating chamber and a pump for reducing the pressure within said treating chamber.

13. A machine for treating metal comprising a treating chamber, seals for said chamber adapted to withstand a pressure substantially equal to the atmosphere, a source of heat for said chamber and seals and a pump connected to said chamber.

14. A device for vapor treating metal comprising a chamber, seals to said chamber adapted to withstand a pressure substantially equal to the atmosphere, a source of heat, means for heating the metal prior to entering the chamber, and a pump member to control pressure within said chamber.

15. A machine for vapor treating metal comprising a metal treating chamber, a seal therefor, a source of heat for said chamber, a pump for controlling the pressure within said chamber, and an equalizer for controlling the distribution of solid treating material in said metal treating chamber.

16. A machine for vapor-treating metal comprising a metal treating chamber, a seal member controlling the openings of said chamber, a source of heat for said chamber, a pump for controlling the pressure within said chamber, and means for moving the metal to be treated relatively to the solid treating material within said chamber.

17. A machine for vapor treating metal comprising a metal treating chamber, a seal member therefor, a source of heat for said chamber, a pump for controlling the pressure within said chamber, means for equalizing the distribution of solid treating material, and means for moving the metal relatively to said treating material.

18. In a vapor treating device for metal a chamber, an annealing device prior to said chamber, said annealing device comprising a liquid bath, a source of heat for said bath, and a pump for controlling the pressure within said chamber.

19. In a device for vapor treating metal, a chamber, a seal member comprising a receptacle of liquid into which a tubular extension of the chamber to be sealed is immersed, a mechanism for moving the chamber respectively to said seal.

20. In a metal treating machine a treating chamber, grooved guide rolls therein, mounted upon an eccentric shaft, the plane of said grooves being inclined to the axis of said roller.

21. In a metal treating machine a metal treating chamber provided with seals adapted to withstand a pressure substantially equal to that of the atmosphere, a heater for said chamber, and guide for directing the motion of the metal to be treated through the said metal treating chamber.

In testimony whereof, I have hereunto subscribed my name this 13th day of June 1914.

SAMUEL TROOD.

Witnesses:
NORMAN A. MARTIN,
J. WATSON.